Patented June 10, 1941

2,245,500

UNITED STATES PATENT OFFICE 2,245,500

POLYVINYL RESIN COMPOSITION

Herbert Rein, Leipzig, and Karl Rössler, Zscherndorf, Kreis Bitterfeld, Germany, assignors to I. G. Farbenindustrie Aktiengesellschaft, Frankfort-on-the-Main, Germany No Drawing. Application November 29, 1938, Serial No. 242,924. In Germany December 2, 1937

4 Claims. (Cl. 260—36)

The production of shaped articles such as threads, tubes or sheets by the thermoplastic shaping of a polymer of polyvinyl chloride i. e. polyvinyl chloride itself and mixed polymerisates thereof containing polyvinyl chloride by spraying, squirting and drawing methods presents considerable difficulty because polyvinyl chloride and its mixed polymerizates even when heated nearly to their decomposition temperature are still extraordinarily tough and highly viscous so that the shaping requires a very high pressure and correspondingly strong machinery. For this reason it is usual to add to the polyvinyl chloride mass either a small proportion of a softener or a lubricating agent of low melting point such as an alcohol wax, a fat or a resin whereby bodies which melt more easily than polyvinyl chloride are produced. The use of such additions, however, is detrimental for the mechanical properties or the heat resistance of the finished article as compared with the article made from pure polyvinyl chloride.

It is therefore an object of the present invention to provide synthetic polymers of the above type comprising polyvinyl chloride which are thermoplastic and which can be sprayed or drawn in the melt.

A still further object of the invention is the provision of articles comprising the vinyl resins referred to herein which have an improved tenacity and high tensile strength.

Still further objects will be apparent from the detailed specification following hereinafter.

This invention depends on the observation that polyvinyl chloride may be rendered plastic when hot without deterioration of the mechanical properties and the heat resistance of the article made by shaping it, if the polyvinyl chloride is first mixed with less than 5 per cent of elementary sulfur. In the case of drawn articles such as threads, tubes or sheets, the addition of sulfur improves the tensile strength or tenacity of the finished article essentially.

As is known the addition of alkali and sulfur tends to harden the polyvinyl chloride. The present invention, however, has nothing to do with the hardening of the mass but is concerned only with rendering the polyvinyl chloride plastic so as to facilitate the spraying and drawing of the mass. The addition of sulfur must therefore be effected in the absence of alkali.

For this purpose it is sometimes necessary to purify the polymerizates before adding the sulfur. In the case of emulsified polymers which may contain substantial amounts of emulsifying agents, soap, etc. it is necessary to remove these alkaline reacting constituents beforehand, since otherwise a hardening of the mass may occur in the press mould instead of a plastification which is the opposite of the purpose of the process of the invention.

The amount of sulfur is critical. If more than 5 per cent of sulfur are added to the vinyl chloride polymer, hard masses resembling ebonite are obtained. These masses can neither be drawn nor sprayed.

The following examples illustrate the invention, the parts being by weight:

*Example 1*

95 parts of polyvinyl chloride and 5 parts of colloidal sulfur are ground together in a ball mill or mixed together on rollers and the mass is worked up to a moulded body and is pressed at the temperature of 160–180° C. Rods, threads, ribbons and the like pressed from the mass and stretched to two or three times their original length obtain high tenacity, about 20 kilos per square millimeter, whereas threads produced from pure polyvinyl chloride under like conditions but without the use of sulfur, have a tenacity of only from 12–14 kilos per square millimeter.

*Example 2*

98 parts of a mixed polymerizate from 80 parts of vinyl chloride and 20 parts of acrylic acid ethyl ester are mixed with 2 parts of flowers of sulfur and the mixture is worked up as described in Example 1. The sulfur-containing mixed polymer flows much more easily in the mould and thus serves to increase the output of the pressing machine in comparison with the working up of the pure mixed polymer.

We claim:

1. An article of manufacture consisting of a polymer of polyvinyl chloride, said polymer containing as the sole plasticizer therefor an addition of no more than 5 per cent of elementary sulfur.

2. An article of manufacture consisting of a polymer of polyvinyl chloride, said polymer containing as the sole plasticizer therefor an addition of from 2 to 5 per cent of elementary sulfur.

3. In a process of producing shaped articles from a polymer of polyvinyl chloride, the improvement which comprises plasticizing said polymer by mixing said polymer with no more than 5 per cent of elementary sulfur.

4. In a process of producing shaped articles from a polymer of polyvinyl chloride, the improvement which comprises plasticizing said polymer by mixing said polymer with 2 to 5 per cent of elementary sulfur.

HERBERT REIN.
KARL RÖSSLER.